United States Patent [19]

Knowles

[11] 4,372,511
[45] Feb. 8, 1983

[54] OPTICAL FIBER CABLE STRAIN RELIEF ASSEMBLY

[75] Inventor: Susan F. Knowles, North Andover, Mass.

[73] Assignee: Bell Telephone Laboratories, Incorporated, Murray Hill, N.J.

[21] Appl. No.: 213,936

[22] Filed: Dec. 8, 1980

[51] Int. Cl.³ .............................................. F16L 3/08
[52] U.S. Cl. ...................................... 248/68 R; 403/41
[58] Field of Search .................... 248/65, 68 R, 73, 49; 403/41

[56] References Cited

U.S. PATENT DOCUMENTS

| 851,375 | 4/1907 | Raymond | 248/49 |
|---|---|---|---|
| 2,058,752 | 10/1936 | Wray | 248/65 |
| 2,372,674 | 4/1945 | Jordan | 248/65 |
| 2,541,828 | 2/1951 | Peck | 248/73 |
| 2,627,083 | 2/1953 | Witthoft | 248/49 X |
| 2,712,916 | 7/1955 | Franz | 248/74 R X |
| 3,321,571 | 5/1967 | Lynch | 248/68 R X |
| 3,508,730 | 4/1970 | Knezo | 248/73 |

Primary Examiner—William H. Schultz
Assistant Examiner—Ramón O. Ramirez
Attorney, Agent, or Firm—David R. Padnes

[57] ABSTRACT

Sharp bends or kinks which produce microcracks in optical fiber cables are eliminated through the use of a strain relief assembly. The assembly comprises a straight cable duct (101) and a curved cable duct (102). The curved cable duct extends from the straight cable duct and guides an optical cable in a gradually curving path which lies in two orthogonal planes. This assembly is especially suitable for guiding optical cables to closely spaced circuit modules within an equipment bay or shelf.

3 Claims, 4 Drawing Figures

OPTICAL FIBER CABLE STRAIN RELIEF ASSEMBLY

TECHNICAL FIELD

The present invention relates to a cable duct and, more particularly, to a cable duct for supporting and guiding an optical fiber cable.

BACKGROUND OF THE INVENTION

In optical fiber transmission systems for telecommunications applications, optical fiber cables are typically routed on the backplane of equipment bays or shelves to individual circuit modules. The optical signal is conducted through tiny glass fibers in the optical cable. In routing the optical cable to circuit modules, sharp bending or kinks in the optical cable can occur which cause microcracks in the light-conducting glass fibers. These microcracks increase transmission losses and can ultimately lead to transmission failure. Existing cable ducts for wire cables are unsatisfactory for optical fiber cables as they do not provide sufficient support and guidance, and are too bulky for use in optical system applications.

SUMMARY OF THE INVENTION

In accordance with the present invention, microcracks in optical fiber cables produced by bending are eliminated through the use of a strain relief assembly. The assembly consists of a straight trough with a curving trough extending therefrom. The curved trough guides an optical cable in a gradual curved path which lies in two orthogonal planes. A support let is affixed to the curved trough for easy assembly mounting.

DETAILED DESCRIPTION

Figure 1:
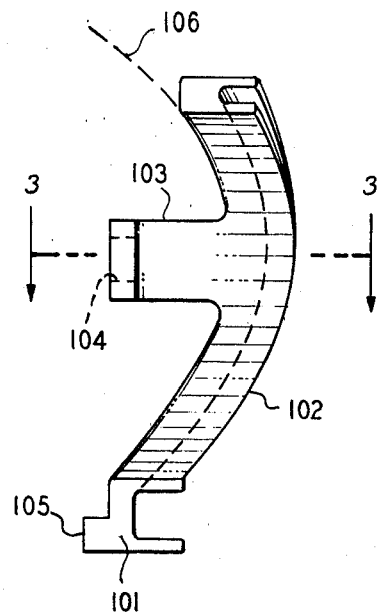
FIG. 1 is a side view of the present invention.
Figure 2:
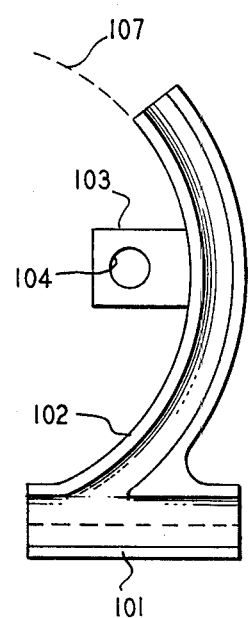
FIG. 2 is a front view of the present invention.
Figure 3:
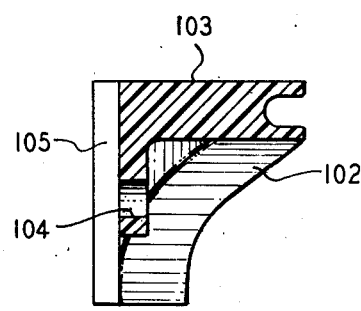
FIG. 3 is a sectional view taken along line 3—3 of FIG. 1.

Refer to FIGS. 1, 2 and 3. The optical fiber cable strain relief assembly comprises straight trough 101, curved trough 102 and support leg 103. Straight trough 101 and cruved trough 102 are advantageously sized to receive multiple and single optical fiber cables, respectively. Curved trough 102 extends from straight trough 101 in two coincident curves 106, 107 which lie in two orthogonal planes. An L-shaped support leg 103, affixed to the underside of curved trough 102, has a hole 104 for screw mounting of the assembly. To prevent rotation of the assembly, a ledge 105 is formed on straight trough 101. This assembly, which can be inexpensively molded out of plastic, provides strain relief to an optical fiber cable by precluding sharp bends and kinks which produce microcracks in the tiny light-transmitting optical fibers. The assembly is also compact for routing cable from a backplane to closely spaced circuit modules.

Figure 4:
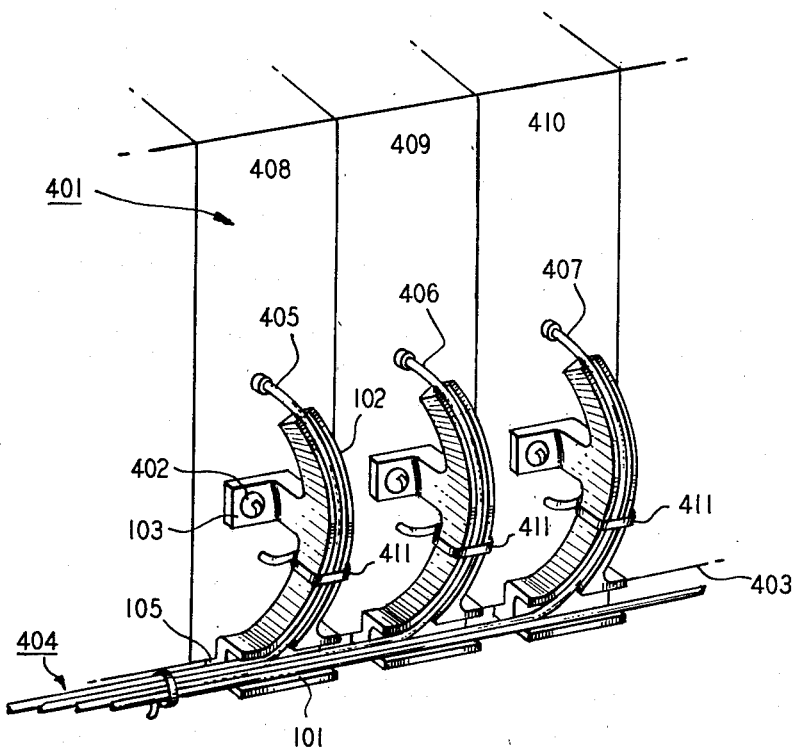
FIG. 4 is a perspective view of the present invention utilized for optical cable wiring to equipment modules.

Referring to FIG. 4, several strain relief assemblies are affixed to backplane 401 by means of screws 402. Ledge 105 extends over edge 403 of backplane 401 to prevent rotation of the strain relief assembly after mounting. Multiple cable bundle 404 is supported by straight troughs 101 in three successive strain relief assemblies. Individual optical cables 405, 406 and 407 are each guided into a separate plug in modules 408, 409 and 410 by a curved trough 102. Curved trough 102 directs each cable through two 90-degree curves lying in two orthogonal planes. This use of two coincident curves significantly reduces the required cable routing space. Each curve has a one-inch radius. Cable straps 411 are tied around each curved trough to firmly secure each cable within the strain relief assembly.

What is claimed is:
1. An assembly for planar surface mounting which supports and guides a plurality of optical fiber cables (404), said assembly being CHARACTERIZED BY
    a straight cable duct (101) having uninterrupted bottom and sidewall surfaces sized to completely receive said cables, said straight duct being open at the top to allow accessability to said cables when said assembly is mounted;
    a curved cable duct (102) which extends from an intermediate position on said straight cable duct to completely receive and guide a selected one of said cables through two coincident gradual curves (106,107) in two orthogonal planes, said curved cable duct being open at the top to allow accessibility to said selected cable when said assembly is mounted;
    a support leg (103) extending from said curved cable duct to an end which is in alignment with a portion of the underside of said straight duct; and
    a protrusion (105) extending from said straight duct beyond said end to restrict rotation of said strain relief assembly by extending over the edge of the planar mounting surface.
2. The assembly of claim 1 wherein the width of said straight duct is substantially greater than the width of said curved duct.
3. The assembly of claim 2 further including;
    means (104) for fastening said support leg to said planar mounting surface.

* * * * *